(12) United States Patent
Dong et al.

(10) Patent No.: US 11,514,706 B2
(45) Date of Patent: Nov. 29, 2022

(54) METHOD AND DEVICE FOR DETECTING HAND GESTURE KEY POINTS

(71) Applicant: BEIJING DAJIA INTERNET INFORMATION TECHNOLOGY CO., LTD., Beijing (CN)

(72) Inventors: Yajiao Dong, Beijing (CN); Yufeng Liu, Beijing (CN); Wen Zheng, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 14 days.

(21) Appl. No.: 17/119,975

(22) Filed: Dec. 11, 2020

(65) Prior Publication Data

US 2021/0097270 A1 Apr. 1, 2021

Related U.S. Application Data

(63) Continuation of application No. PCT/CN2019/103119, filed on Aug. 28, 2019.

(30) Foreign Application Priority Data

Oct. 30, 2018 (CN) .......................... 201811280155.X

(51) Int. Cl.
*G06V 40/10* (2022.01)
*G06K 9/62* (2022.01)
*G06V 10/22* (2022.01)

(52) U.S. Cl.
CPC ............ *G06V 40/113* (2022.01); *G06K 9/627* (2013.01); *G06K 9/6257* (2013.01); *G06K 9/6262* (2013.01); *G06V 10/225* (2022.01)

(58) Field of Classification Search
CPC .. G06V 40/113; G06V 10/225; G06K 9/6257; G06K 9/6262; G06K 9/627
(Continued)

(56) References Cited

U.S. PATENT DOCUMENTS

| 2013/0294651 | A1* | 11/2013 | Zhou | G06V 40/28 |
| | | | | 382/103 |
| 2015/0186707 | A1* | 7/2015 | Joo | G06V 40/113 |
| | | | | 382/103 |

(Continued)

FOREIGN PATENT DOCUMENTS

| CN | 103513759 A | 1/2014 |
| CN | 106886751 A | 6/2017 |

(Continued)

OTHER PUBLICATIONS

International Search Report and Written Opinion of PCT Application No. PCT/CN2019/103119—15 pages (dated Nov. 29, 2019).

(Continued)

*Primary Examiner* — Michael R Neff
(74) *Attorney, Agent, or Firm* — Knobbe, Martens, Olson & Bear, LLP

(57) ABSTRACT

A method for detecting gesture key points can include: acquiring a target image to be detected; determining a gesture category according to the target image, the gesture category being a category of a gesture contained in the target image; determining a target key point detection model corresponding to the gesture category from a plurality of key point detection models; and performing a key point detection on the target image by the target key point detection model.

11 Claims, 5 Drawing Sheets

Acquiring a target image to be detected and determining a gesture category according to the target image, by an electronic device — S510

Determining a target key point detection model corresponding to the gesture category by the electronic device from a plurality of key point detection models obtained by training — S520

Acquiring gesture key points corresponding to the gesture category and positions of the gesture key points in the target image by the electronic device by inputting the target image into the target key point detection model corresponding to the gesture category. — S530

(58) Field of Classification Search
USPC .......................................................... 382/103
See application file for complete search history.

(56) References Cited

U.S. PATENT DOCUMENTS

| | | | |
|---|---|---|---|
| 2016/0011668 A1 | 1/2016 | Gilad-Bachrach et al. | |
| 2017/0068849 A1 | 3/2017 | Lim et al. | |

FOREIGN PATENT DOCUMENTS

| | | |
|---|---|---|
| CN | 107168527 A | 9/2017 |
| CN | 107679512 A | 2/2018 |
| CN | 107967061 A | 4/2018 |
| CN | 108227912 A | 6/2018 |
| CN | 108229277 A | 6/2018 |
| CN | 108229318 A | 6/2018 |
| CN | 108520251 A | 9/2018 |
| CN | 109446994 A | 3/2019 |

OTHER PUBLICATIONS

First Office Action of Chinese Patent Application No. 201811280155. X—11 pages (dated May 21, 2020).
Notification to Grant Patent Right for Invention of Chinese Patent Application No. 201811280155.X—3 pages (dated Sep. 29, 2020).
Newell et al., "Stacked Hourglass Networks for Human Pose Estimation", European Conference on Computer Vision—17 pages (dated Jul. 26, 2016).
Liu et al., "SSD: Single Shot MultiBox Detector", European Conference on Computer Vision—9 pages (dated Dec. 8, 2015).

* cited by examiner

METHOD AND DEVICE FOR DETECTING HAND GESTURE KEY POINTS

CROSS-REFERENCE TO RELATED APPLICATION

The present disclosure is a continuation application of an international application No. PCT/CN2019/103119, filed on Aug. 28, 2019, which claims priority to Chinese Patent Application No. 201811280155.X, filed on Oct. 30, 2018 in the China National Intellectual Property Administration, the disclosures of which are incorporated herein by reference in their entireties.

TECHNICAL FIELD

The present disclosure relates to the field of gesture recognition technologies, and in particular, relates to a method for detecting gesture key points, and an electronic device and a storage medium thereof.

BACKGROUND

With the advancement of the human-computer interaction technology, human-computer interaction based on the recognition technology has been developed. For example, in the human-computer interaction based on gesture recognition technology, an electronic device collects a target image with a gesture, performs a gesture recognition on the collected target image with the gesture, and converts a result of the gesture recognition into a corresponding command, then a computer runs the corresponding command and displays an execution result on a display.

SUMMARY

Embodiments of the present disclosure provide a method for detecting gesture key points, and an electronic device and a storage medium thereof. Provided technical solutions are as follows:

In an aspect, embodiments of the present disclosure provide a method for detecting gesture key points including:
  acquiring a target image to be detected;
  determining a gesture category according to the target image, the gesture category being a category of a gesture contained in the target image;
  determining a target key point detection model corresponding to the gesture category from a plurality of key point detection models; and
  performing a key point detection on the target image by the target key point detection model.

In another aspect, embodiments of the present disclosure provide an electronic device. The electronic device includes a processor and a memory configured to store at least one instruction executable by the processor;
  wherein the at least one instruction, when executed by the processor, causes the processor to perform a method including:
  acquiring a target image to be detected;
  determining a gesture category according to the target image, the gesture category being a category of a gesture contained in the target image;
  determining a target key point detection model corresponding to the gesture category from a plurality of key point detection models; and
  performing a key point detection on the target image by the target key point detection model.

In yet another aspect, embodiments of the present disclosure provide a non-transitory computer-readable storage medium including at least one instruction therein. The at least one instruction, when executed by a processor of an electronic device, causes the electronic device to perform a method including:
  acquiring a target image to be detected;
  determining a gesture category according to the target image, the gesture category being a category of a gesture contained in the target image;
  determining a target key point detection model corresponding to the gesture category from a plurality of key point detection models; and
  performing a key point detection on the target image by the target key point detection model.

It should be understood that the above general description and the following detailed description are only illustrative, but are not intended to limit the present disclosure, and any product or method practiced in the present disclosure does not necessarily need to achieve all the above advantages at the same time.

BRIEF DESCRIPTION OF DRAWINGS

For clearer descriptions of the technical solutions in the embodiments of the present disclosure or in the related art, the following briefly introduces the accompanying drawings required for describing the embodiments or the related art. Apparently, the accompanying drawings in the following description show merely some embodiments of the present disclosure, and a person of ordinary skill in the art may still derive other drawings from these accompanying drawings without creative efforts.

The drawings herein are incorporated into the specification and constitute a part of the specification, show embodiments that conform to the present disclosure, and are used together with the specification to explain the principle of the present disclosure.

DESCRIPTION OF EMBODIMENTS

The technical solutions of the embodiments of the present disclosure will be described clearly and completely with reference to the accompanying drawings in the embodiments of the present disclosure. It is apparent that the described embodiments are only a part of example embodiments of the present disclosure, rather than all of the embodiments. According to the described example embodiments of the present disclosure, all of the other embodiments obtained by a person skilled in the art without consuming any creative work fall within the protection scope of the present disclosure.

Figure 2:
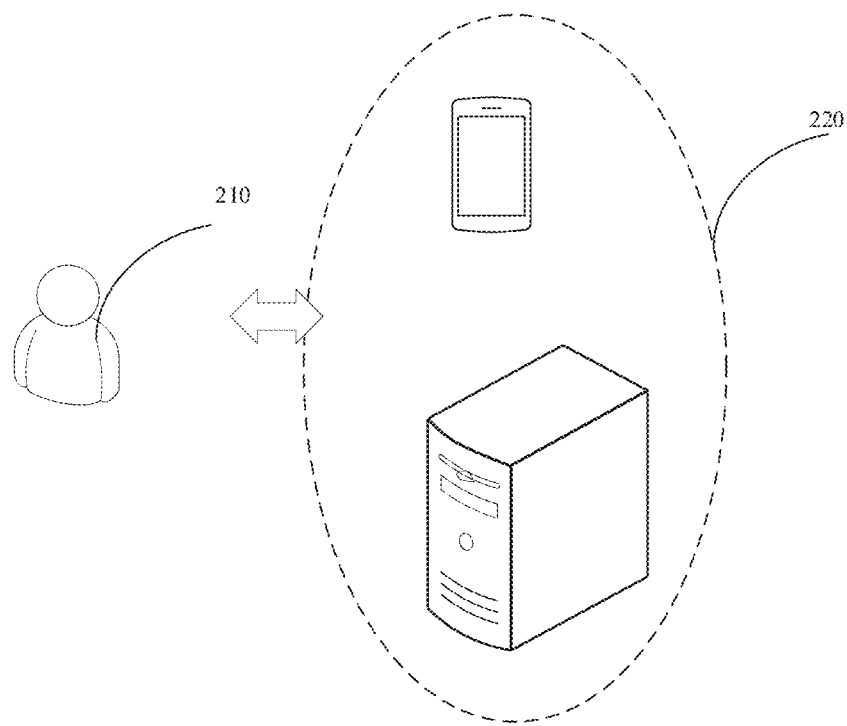
FIG. 2 is a schematic diagram of an implementation environment of a method for detecting gesture key points according to an example embodiment.

FIG. 2 is a schematic diagram of an implementation environment of a method for detecting gesture key points according to an example embodiment. Referring to FIG. 2, the implementation environment includes a user 210 and an electronic device 220. The electronic device 220 performs a gesture key point detection on a target image to be detected, and the target image is an image including a gesture of the user 210.

In some embodiments, the gesture detection method provided in embodiments of the present disclosure is applied to any electronic device with an image processing function, such as a mobile terminal or a server, etc., which is not limited in embodiments of the present disclosure.

In some embodiments, the electronic device is a mobile terminal, that is, a method for detecting gesture key points according to embodiments of the present disclosure is applied to a mobile terminal. The mobile terminal may be a mobile phone, a computer, a message transceiver device, a game console, a tablet device, a medical device, a fitness device, a personal digital assistant, or the like.

Figure 3:
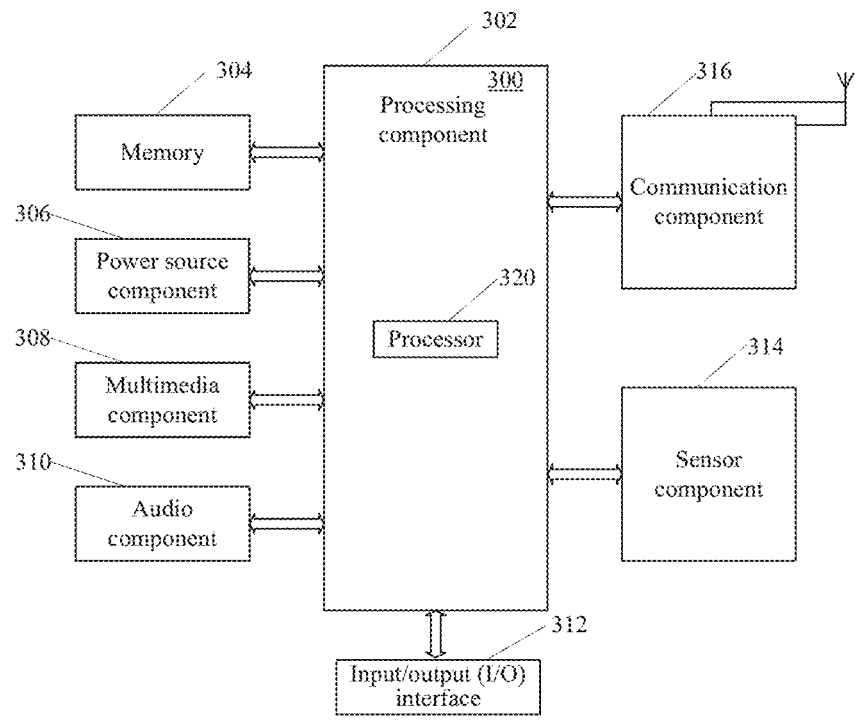
FIG. 3 is a schematic structural diagram of a mobile terminal according to an example embodiment.

FIG. 3 is a schematic structural diagram of a mobile terminal according to an example embodiment. Referring to FIG. 3, the mobile terminal 300 may include one or more of: a processing component 302, a memory 304, a power source component 306, a multimedia component 308, an audio component 310, an input/output (I/O) interface 312, a sensor component 314, and a communication component 316.

The processing component 302 typically controls overall operations of the mobile terminal 300, such as the operations associated with display, phone calls, data communications, camera operations, and recording operations. The processing component 302 may include one or more processors 320 to execute instructions to perform all or part of steps of the above methods.

Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the mobile terminal 300. Examples of such data include instructions for any application or methods operated on the mobile terminal 300, contact data, phonebook data, messages, pictures, video, and the like. The memory 304 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power component 306 provides power to various components of the mobile terminal 300. The power component 306 may include a power management system, one or more power sources, and any other components associated with the generation, management, and distribution of power in the mobile terminal 300.

The multimedia component 308 includes a screen providing an output interface between the mobile terminal 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 308 includes a front camera and/or a rear camera. The front camera and the rear camera may receive an external multimedia datum while the mobile terminal 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the mobile terminal 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the mobile terminal 300. For instance, the sensor component 314 may detect an open/closed status of the mobile terminal 300, relative positioning of components, e.g., the display and the keypad, of the mobile terminal 300, a change in position of the mobile terminal 300 or a component of the mobile terminal 300, a presence or absence of user contact with the mobile terminal 300, an orientation or an acceleration/deceleration of the mobile terminal 300, and a change in temperature of the mobile terminal 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the mobile terminal 300 and other devices. The mobile terminal 300 is capable of accessing a wireless model based on a communication protocol, such as WiFi, an operator network (e.g., 2G, 3G, 4G or 5G), or a combination thereof. In one example embodiment, the communication component 316 receives a broadcast signal or broadcast associated information from an external broadcast management system via a broadcast channel. In one example embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example embodiment, the mobile terminal 300 may be implemented by one or more application specific integrated circuits (ASICs), digital signal processors (DSPs), digital signal processing devices (DSPDs), programmable logic devices (PLDs), field-programmable gate array (FPGAs), controllers, microcontrollers, microprocessors or other electronic components to execute all or part of steps of the methods described above.

By the mobile terminal according to the embodiment of the present disclosure, after acquiring a target image and a gesture category of a gesture contained in the target image, a target key point detection model corresponding to the gesture category is determined from a plurality of key point detection models, and then a key point detection is performed on the target image by the target key point detection model. In the embodiment of the present disclosure, each key point detection model in the plurality of key point detection models corresponds to one gesture category, and parameters of the target key point detection model corresponding to the gesture category are parameters for the gesture category. Therefore, the accuracy in detection of gesture key points may be improved when a key point detection is performed on the target image by using the target key point detection model corresponding to the gesture category.

An example embodiment further provides a computer program product. The computer program product may be stored in the memory 304 and include at least one instruction. In response to the at least one instruction being executed by the processor 320 of the mobile terminal 300, the mobile terminal 300 is enabled to perform the method for detecting gesture key points.

An example embodiment further provides a non-transitory computer-readable storage medium including at least one instruction therein, such as the memory 304 including at least one instruction executable by the processor 320 in the mobile terminal 300 to perform the above methods. For example, the non-transitory computer-readable storage medium may be a ROM, a random-access memory (RAM), a compact disc read-only memory (CD-ROM), a magnetic tape, a floppy disk, an optical data storage device, or the likes.

Figure 4:
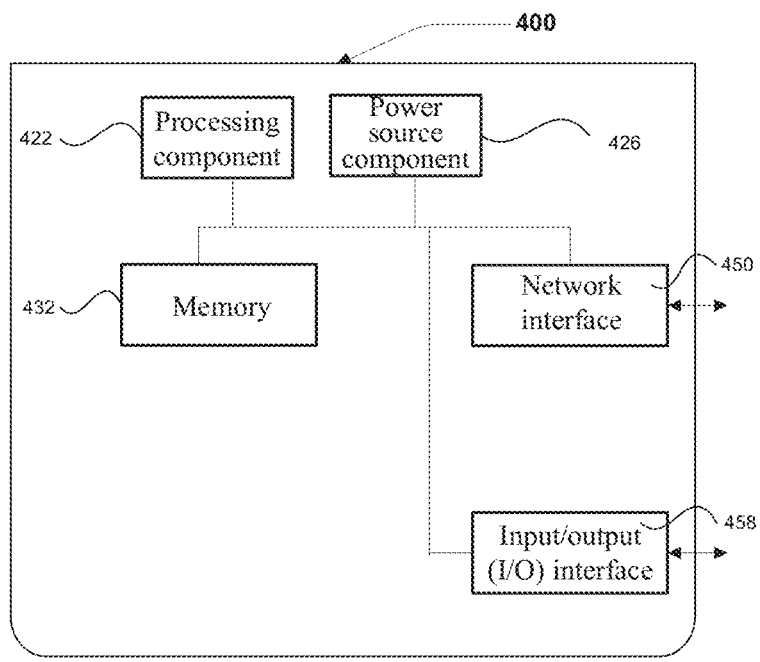
FIG. 4 is a schematic structural diagram of a server according to an example embodiment.

In some embodiments, in response to the electronic device being a server, a method for detecting gesture key points according to embodiments of the present disclosure is applied to a server. FIG. 4 is a schematic structural diagram of a server 400 according to an example embodiment. Referring to FIG. 4, the server 400 includes a processing component 422 which further includes one or more processors, and memory resources represented by a memory 432 for storing at least one instruction executable by the processing component 422, for example an application program. The application program stored in the memory 432 may include one or more modules, each of which corresponds to a set of instructions. Further, the processing component 422 is configured to execute the instructions to perform all or part of steps of the above methods.

The server 400 may further include a power source component 426 configured to perform power source management of the server 400, a wired or wireless model interface 450 configured to connect the server 400 to a network, and an input/output (I/O) interface 458. The server 400 may operate an operating system stored in the memory 432, such as Windows Server™, Mac OS X™, Unix™, Linux™, FreeBSD™, or the like.

By the server according to the embodiment of the present disclosure, after acquiring a target image and a gesture category of a gesture contained in the target image, a target key point detection model corresponding to the gesture category is determined from a plurality of key point detection models, and then a key point detection is performed on the target image by the target key point detection model. In the embodiment of the present disclosure, each key point detection model in the plurality of key point detection models corresponds to one gesture category, and parameters of the target key point detection model corresponding to the gesture category are parameters for the gesture category. Therefore, the accuracy in detection of gesture key points may be improved when a key point detection is performed on the target image by using the target key point detection model corresponding to the gesture category.

An example embodiment further provides a computer program product. The computer program may be stored in the memory 432, and include at least one instruction therein. The at least one instruction, when executed by the processing component 422 of the server 400, causes the server 400 to perform the method for detecting gesture key points.

An embodiment of the present disclosure further provides a computer program. The computer program, when running on an electronic device, causes the electronic device to perform all or part of steps of the above methods.

Embodiments of the present disclosure provide a method for detecting gesture key points, and an electronic device and a storage medium thereof, which are able to improve the accuracy in detection of gesture key points. In the following, a method for detecting gesture key points in embodiments of the present disclosure is first introduced.

In some examples, a method for detecting gesture key points according to embodiments of the present disclosure is applied to an electronic device, which is a smart phone, a personal computer, or a server.

Figure 1:
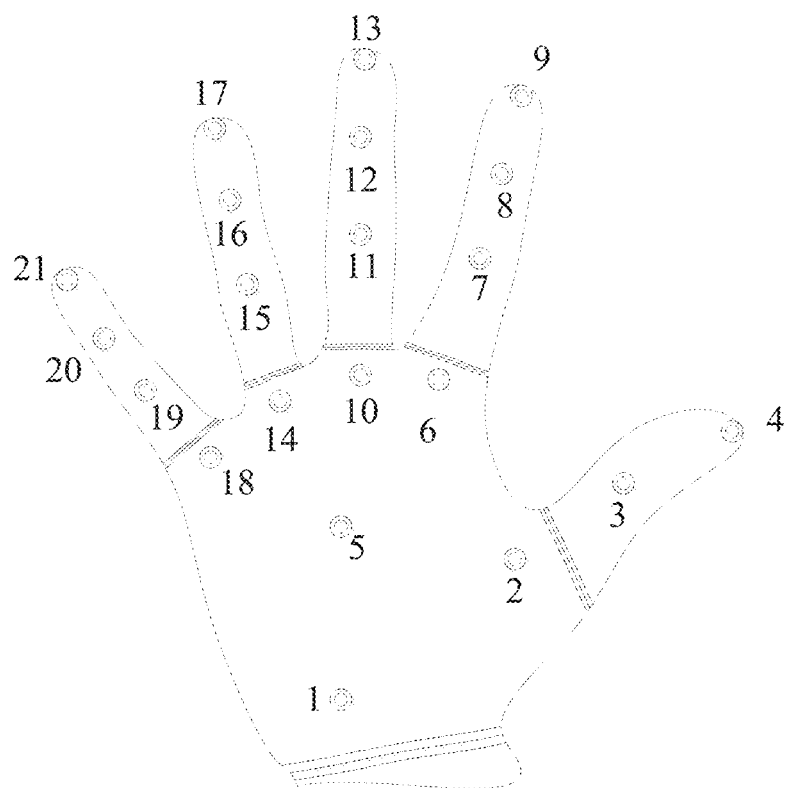
FIG. 1 is a schematic diagram of 21 key points in a gesture.

FIG. 1 is a flowchart of a first example of a method for detecting gesture key points according to an example embodiment. The method may include the following steps:

In S510, a target image to be detected is acquired and a gesture category is determined according to the target image, by an electronic device.

When the electronic device is employed to detect key points of a gesture, a user inputs the target image to be detected and the gesture category of the target image into the above electronic device. Therefore, the electronic device acquires the target image and the gesture category of the target image. The gesture category is a category of a gesture contained in the target image. For example, the gesture category includes, but not limited to, OK, finger-heart with one hand, finger-heart with two handed, five fingers stretched, thumbs up, shake hand, palm up, scissors hand, index-finger pointed, fist, etc.

In some examples, the target image is marked with a corresponding gesture category. At this time, the electronic device directly extracts the gesture category of the target image from the target image.

In some embodiments, the target image is a target image of one gesture category.

In some embodiments, the electronic device is further able to categorize the target image, and determine a gesture category of the target image according to the target image.

In some embodiments, the electronic device is provided with a pre-trained gesture categorization model, then the user inputs a target image into the electronic device, and the electronic device categorizes the target image and determine a gesture category of the target image by using the pre-trained gesture categorization model.

In some embodiments, a gesture categorization model is preset in the above electronic device. The gesture categorization model is a gesture categorization model in the related art, and then a first sample image marked with a gesture category and a gesture position of a gesture is input into the above electronic device. After receiving the first sample image, the electronic device trains the preset gesture categorization model according to the first sample image.

For example, the gesture categorization model is a neural network-based categorization algorithm, or a K nearest neighbor categorization algorithm.

In S520, a target key point detection model corresponding to the gesture category is determined by the electronic device from a plurality of key point detection models obtained by training.

The key point detection model employs one of convolutional neural networks, such as a multi-layer deep convolutional neural network. The electronic device trains one key point detection model for each gesture category, that is, one gesture category corresponds to one key point detection model. In some embodiments, for each gesture category, the training of the key point detection model corresponding to the gesture category includes following steps performed by the electronic device: taking the target images of the gesture category as the input of the multi-layer deep convolutional neural network, and taking the gesture key points and the position of each gesture key point in the target image as the output of the multi-layer deep convolutional neural network, training the multi-layer deep convolutional neural network to obtain the trained key point detection model corresponding to the gesture category.

In some embodiments, after the electronic device acquires the target image and the gesture category of the target image, in order to realize adopting corresponding key point detection models for different gesture categories, the target key point detection model corresponding to the above gesture category is searched in the plurality of key point detection models obtained by training in advance.

Each key point detection model in the plurality of key point detection models corresponds to one gesture category.

In some embodiments, the plurality of key point detection models are detection models with the same structure or different detection models. For example, the key point detection model is a second-order stacked deep convolutional hourglass network.

In response to the plurality of key point detection models being detection networks with the same structure, the parameters of respective key point detection models are different.

In some examples, the electronic device trains the key point detection model corresponding to each gesture category in the following manner:

In step A, a preset key point detection model and a second sample image marked with the same gesture category are acquired by the electronic device.

The second sample image is marked with gesture key points corresponding to the gesture category. The marked gesture key points are a plurality of key points among the 21 key points shown in FIG. 1 or other gesture key points. The second sample image marked with the gesture category includes the positions of the gesture key points.

In this way, when training is carried out by subsequent steps, the trained key point detection model is able to recognize the position of gesture key points when recognizing key points in a gesture.

In step B, predicted gesture key points corresponding to the second sample image are acquired by the electronic device by inputting the second sample image marked with the same gesture category into the preset key point detection model.

In some examples, before the second sample image marked with the same gesture category is input to the preset key point detection model, the electronic device initializes the parameters in the preset key point detection model by adopting a Gaussian distribution with a mean value and a variance $\delta^2$.

The mean value $\mu$ and the variance $\delta^2$ may be set according to experiences, for example, the mean value $\mu$ is 0, and the variance $\delta^2$ is 0.01.

In step C, the trained key point detection model is acquired by the electronic device by adjusting parameters of the preset key point detection model on the basis of a third loss between the predicted gesture key points and the gesture key points marked in the second sample image.

In some examples, step A to step C are iteratively and cyclically performed. In order to reduce the training complexity and the time overhead of training the preset key point detection model, after the predicted gesture key points corresponding to the second sample image are acquired by step B, the accuracy of the prediction is calculated by the electronic device on the basis of the predicted gesture key points and the gesture key points marked in the second sample images. In response to the accuracy of the prediction being greater than or equal to a preset accuracy threshold, the preset key point detection model is used by the electronic device as the key point detection model corresponding to the gesture category.

In response to the accuracy of the prediction being smaller than the preset accuracy threshold, the electronic device performs step A to step C, until the accuracy of the prediction is greater than or equal to the preset accuracy threshold. In this way, the key point detection model corresponding to the gesture category is obtained.

In S530, gesture key points corresponding to the gesture category and positions of the gesture key points in the target image are acquired by the electronic device by inputting the target image into the target key point detection model corresponding to the gesture category.

The electronic device performs a key point detection on the target image by the target key point detection model. After acquiring the target key point detection model corresponding to the gesture category of the target image, the electronic device inputs the target image into the target key point detection model, such that the target key point detection model detects the gesture key points in the target image and the position of each gesture key point in the target image.

In this way, the detection result output by the target key point detection model is the gesture key points corresponding to the gesture category of the target image and the positions of the gesture key points in the target image.

By the method for detecting gesture key points according to the embodiment of the present disclosure, after acquiring a target image and a gesture category of a gesture contained in the target image, a target key point detection model corresponding to the gesture category is determined from a plurality of key point detection models, and then a key point detection is performed on the target image by the target key point detection model. In the embodiment of the present disclosure, each key point detection model in the plurality of key point detection models corresponds to one gesture category, and parameters of the target key point detection model corresponding to the gesture category are parameters for the gesture category. Therefore, the accuracy in detection of gesture key points may be improved when a key point detection is performed on the target image by using the target key point detection model corresponding to the gesture category.

Figure 5:
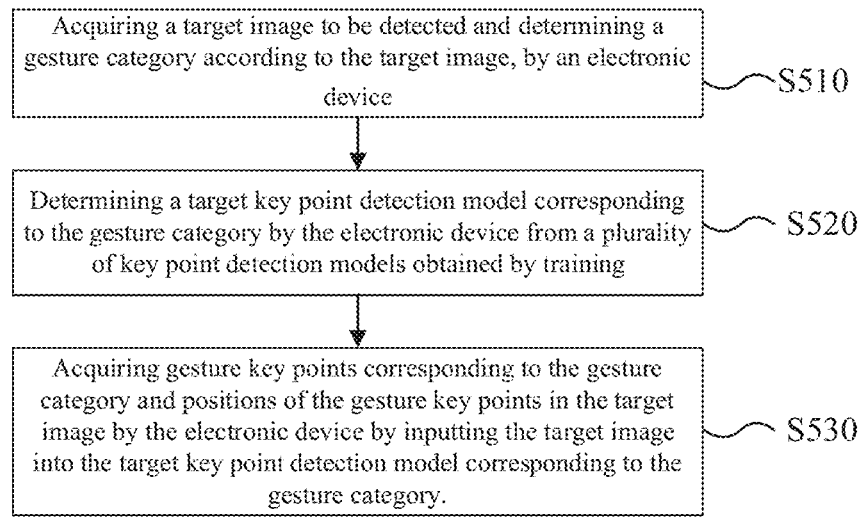
FIG. 5 is a flowchart of an example of a method for detecting gesture key points according to an example embodiment.
Figure 6:
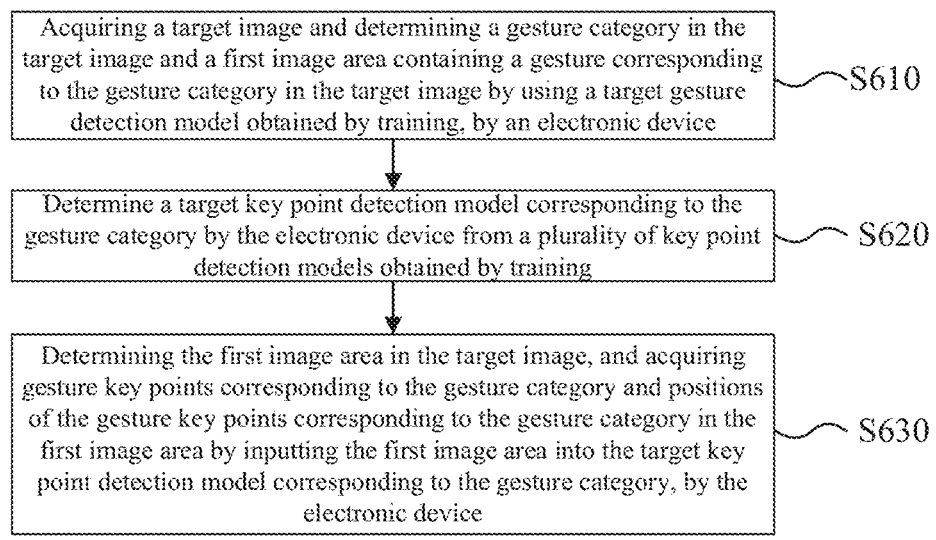
FIG. 6 is a flowchart of another example of a method for detecting gesture key points according to an example embodiment.

On the basis of the method for detecting gesture key points shown in FIG. 5, embodiments of the present disclosure further provide a possible implementation. FIG. 6 is a flowchart of a second example of a method for detecting gesture key points according to an example embodiment. In this example embodiment, a first image area is first determined from the target image, and then a key point detection is performed on the first image area by the target key point detection model. For illustration, the first image area is an image area where a gesture in the target image is located. As shown in FIG. 6, the method may include the following steps:

In S610, a target image is acquired, and a gesture category in the target image and a first image area containing a gesture corresponding to the gesture category in the target image are determined by using a target gesture detection model obtained by training, by an electronic device.

In some examples, the target image includes one gesture or a plurality of gestures. In response to the target image including a plurality of gestures, the electronic device detects the category of each gesture in the target image and the area of the gesture of the gesture category in the target image by using a pre-trained target gesture detection model.

In some embodiments, the electronic device determines the first image area from the target image by the target gesture detection model.

In some examples, the target gesture detection model may be trained in the following ways:

In step D, a first sample image including a pre-marked gesture category and a pre-marked gesture position is obtained by the electronic device.

In some examples, the user first manually marks the first sample image, i.e., marks the gesture category in the first sample image and the gesture position corresponding to each gesture category, and then input the first sample image into the electronic device. Therefore, the electronic device may obtain the first sample image.

In step E, a gesture detection result of the first sample image is obtained by the electronic device by inputting the first sample image into a preset gesture detection model, wherein the gesture detection result includes a predicted gesture category and a predicted gesture position.

After acquiring the first sample image, the electronic device inputs the first sample image into a preset gesture detection model, such that the preset gesture detection model predicts the first sample image. For example, the preset gesture detection model is a Single Shot MultiBox Detector (SSD) gesture detection model.

In step F, a target gesture detection model is acquired by the electronic device by adjusting parameters of the preset target gesture detection model on the basis of a first loss between the pre-marked gesture category and the predicted gesture category, and a second loss between the pre-marked gesture position and the predicted gesture position.

After acquiring the predicted gesture category and the predicted gesture position by the preset target gesture detection model, the electronic device determines the first loss between the pre-marked gesture category and the predicted gesture category on the basis of the pre-marked gesture category and the predicted gesture category, and determines the second loss between the pre-marked gesture position and the predicted gesture position on the basis of the pre-marked gesture position and the predicted gesture position.

Then the parameters of the preset target gesture detection model are adjusted by the electronic device on the basis of the first loss and the second loss.

In some examples, step D to step F are iteratively and cyclically performed. In order to reduce the training complexity and the time overhead of training the preset target gesture detection model, after the first loss and the second loss are obtained by step F, whether the first loss is less than a first loss threshold and whether the second loss is less than a second loss threshold may be judged by the electronic device. If the first loss is less than the first loss threshold and the second loss is less than the second loss threshold, the preset target gesture detection model is taken by the electronic device as the trained target gesture detection model; and otherwise, the parameters of the preset target gesture detection model are adjusted by the electronic device on the basis of the first loss and the second loss, and step D to step F are performed again by the electronic device, until the first loss is less than a first loss threshold and the second loss is less than a second loss threshold. In this way, the target gesture detection model is obtained. The adjusted target gesture detection model is employed to predict the first sample image.

In some examples, the position of the first image area in the target image is the upper left corner, the lower right corner or any corner. Alternatively, the position of the first image area in the target image is indicated by a width pixel value and a height pixel value of the first image area by the electronic device. In embodiments of the present disclosure, the manner for indicating the position of the first image area in the target image is not limited.

In step S620, a target key point detection model corresponding to the gesture category is determined by the electronic device from a plurality of key point detection models obtained by training.

It should be noted that S620 in this embodiment is the same as S520 in the first embodiment, and S520 in the first embodiment may be referred to for the detailed description, which is not described herein any further.

In S630, the first image area in the target image is determined, and gesture key points corresponding to the gesture category and positions of the gesture key points corresponding to the gesture category in the first image area are acquired by inputting the first image area into the target key point detection model corresponding to the gesture category, by the electronic device.

In some examples, in response to the target image containing a plurality of gesture categories, the electronic device is able to recognize the gesture category of each gesture and the position of each gesture in the target image, that is, the position of the first image area, by using the target gesture detection model obtained by the above training.

In order to detect the gesture key points of each gesture category, the electronic device extracts the first image area from the target image, and then input the first image area into the target key point detection model corresponding to the gesture category, then the target key point detection model detects the gesture key points in the first image area and the position of each gesture key point in the first image area.

In this way, the detection result output by the target key point detection model corresponding to the gesture category includes the gesture key points corresponding to the gesture category of the target image and the positions of the gesture key points in the first image area.

In some examples, after acquiring the positions of the gesture key points corresponding to each gesture category in the first image area, the electronic device determines the positions of the gesture key points corresponding to each gesture category in the target image in combination with the position of the first image area in the target image.

In the embodiments of the present disclosure, when the target image includes a plurality of gesture categories, the electronic device detects the positions of the gesture key points corresponding to each gesture category in the target image. Therefore, on the premise of improving the detection accuracy, the detection of the gesture key points in the target image containing a plurality of gesture categories can be realized.

Figure 7:
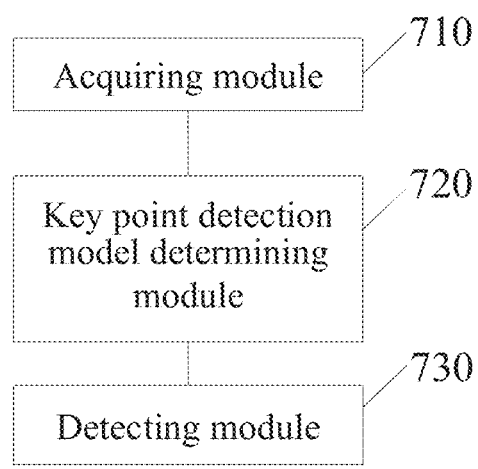
FIG. 7 is a schematic structural diagram of an apparatus for detecting gesture key points according to an example embodiment.

Corresponding to the above method embodiments, embodiments of the present disclosure further provide an apparatus for detecting gesture key points. FIG. 7 is a schematic structural diagram of an apparatus for detecting gesture key points according to an example embodiment. Referring to FIG. 7, the apparatus includes an acquiring module 710, a key point detection model determining module 720, and a detecting module 730.

The acquiring module 710 is configured to acquire a target image to be detected, and determine a gesture category according to the target image, the gesture category being a category of a gesture contained in the target image.

The key point detection model determining module 720 is configured to determine a target key point detection model corresponding to the gesture category from a plurality of key point detection models.

The detection module 730 is configured to perform a key point detection on the target image by the target key point detection model.

In some embodiments, the acquiring module 710 is configured to determine the gesture category according to the target image by a gesture categorization model.

In some embodiments, the detecting module 730 is configured to: determine a first image area from the target image, the first image area being an image area where the gesture in the target image is located; and perform a key point detection on the first image area by the target key point detection model.

In some embodiments, the detecting module 730 is configured to determine the first image area from the target image by the target gesture detection model.

In some embodiments, the detecting module 730 is configured to: acquire a first sample image marked with a gesture category of a gesture contained in the first sample image and a gesture position of the gesture in the first sample image; obtain a gesture detection result of the first sample image by inputting the first sample image into a preset gesture detection model, the gesture detection result including a predicted gesture category and a predicted gesture position; and acquire the target gesture detection model by adjusting parameters of the preset gesture detection model on the basis of a first loss between the marked gesture category and the predicted gesture category, and a second loss between the marked gesture position and the predicted gesture position.

In some embodiments, the key point detection model determining module 720 is configured to: acquire a preset key point detection model and a second sample image marked with the gesture category, the second sample image being marked with gesture key points; obtain predicted gesture key points of the second sample image by inputting the second sample image into the preset key point detection model; and acquire the target key point detection model by adjusting parameters of the preset key point detection model on the basis of a third loss between the predicted gesture key points and the gesture key points marked in the second sample image.

By the apparatus for detecting gesture key points according to the embodiment of the present disclosure, after acquiring a target image and a gesture category of a gesture contained in the target image, a target key point detection model corresponding to the gesture category is determined from a plurality of key point detection models, and then a key point detection is performed on the target image by the target key point detection model. In the embodiment of the present disclosure, each key point detection model in the plurality of key point detection models corresponds to one gesture category, and parameters of the target key point detection model corresponding to the gesture category are parameters for the gesture category. Therefore, the accuracy in detection of gesture key points may be improved when a key point detection is performed on the target image by using the target key point detection model corresponding to the gesture category.

Regarding the apparatus in the above embodiment, the specific manner in which each module performs operations has been described in detail in the above method embodiments, which is not described herein any further.

It should be noted that, as used herein, relation terms such as "first" and "second" are used merely to distinguish a subject or an operation from another subject or another operation, and not to imply any substantial relation or order between these subjects or operations. Moreover, terms "include", "contain" or any variation thereof are intended to cover a nonexclusive containing, such that a process, a method, an item or a device containing a series of elements not only includes these elements, but also includes other elements that are not set forth specifically, or also includes an inherent element of such a process, method, item or device. Without further limitation, an element defined by a phrase "include a" does not mean that other elements are excluded from the process, method, item, or device including the same element.

What is claimed is:
1. A method for detecting gesture key points, comprising:
   acquiring a target image to be detected;
   determining a gesture category according to the target image, the gesture category being a category of a gesture contained in the target image;
   determining a target key point detection model corresponding to the gesture category from a plurality of key point detection models; and
   performing a key point detection on the target image by the target key point detection model,
   wherein the target key point detection model is trained by:
      acquiring a preset key point detection model and a second sample image marked with the gesture category, the second sample image being marked with gesture key points;
      obtaining predicted gesture key points of the second sample image by inputting the second sample image into the preset key point detection model; and
      acquiring the target key point detection model by adjusting parameters of the preset key point detection model on the basis of a first loss between the predicted gesture key points and the gesture key points marked in the second sample image.
2. The method according to claim 1, wherein said determining the gesture category according to the target image comprises:

determining the gesture category according to the target image by a gesture categorization model.

3. The method according to claim 1, wherein said performing a key point detection on the target image by the target key point detection model comprises:
   determining a first image area from the target image, the first image area being an image area where the gesture in the target image is located; and
   performing a key point detection on the first image area by the target key point detection model.

4. The method according to claim 3, wherein said determining the first image area from the target image comprises:
   determining the first image area from the target image by a target gesture detection model.

5. The method according to claim 4, wherein the target gesture detection model is trained by:
   acquiring a first sample image marked with a gesture category of a gesture contained in the first sample image and a gesture position of the gesture in the first sample image;
   obtaining a gesture detection result of the first sample image by inputting the first sample image into a preset gesture detection model, the gesture detection result comprising a predicted gesture category and a predicted gesture position; and
   acquiring the target gesture detection model by adjusting parameters of the preset gesture detection model on the basis of a second loss between the marked gesture category and the predicted gesture category, and a third loss between the marked gesture position and the predicted gesture position.

6. An electronic device, comprising a processor and a memory storing at least one instruction executable by the processor;
   wherein the at least one instruction, when executed by the processor, causes the processor to perform a method comprising:
      acquiring a target image to be detected;
      determining a gesture category according to the target image, the gesture category being a category of a gesture contained in the target image;
      determining a target key point detection model corresponding to the gesture category from a plurality of key point detection models; and
      performing a key point detection on the target image by the target key point detection model,
      wherein the target key point detection model is trained by:
         acquiring a preset key point detection model and a second sample image marked with the gesture category, the second sample image being marked with gesture key points;
         obtaining predicted gesture key points of the second sample image by inputting the second sample image into the preset key point detection model; and
         acquiring the target key point detection model by adjusting parameters of the preset key point detection model on the basis of a first loss between the predicted gesture key points and the gesture key points marked in the second sample image.

7. The electronic device according to claim 6, wherein said determining the gesture category according to the target image comprises:
   determining the gesture category according to the target image by a gesture categorization model.

8. The electronic device according to claim 6, wherein said performing the key point detection on the target image by the target key point detection model comprises:
   determining a first image area from the target image, the first image area being an image area where the gesture in the target image is located; and
   performing a key point detection on the first image area by the target key point detection model.

9. The electronic device according to claim 8, wherein said determining the first image area from the target image comprises:
   determining the first image area from the target image by a target gesture detection model.

10. The electronic device according to claim 9, wherein the target gesture detection model is trained by:
    acquiring a first sample image marked with a gesture category of a gesture contained in the first sample image and a gesture position of the gesture in the first sample image;
    obtaining a gesture detection result of the first sample image by inputting the first sample image into a preset gesture detection model, the gesture detection result comprising a predicted gesture category and a predicted gesture position; and
    acquiring the target gesture detection model by adjusting parameters of the preset gesture detection model on the basis of a second loss between the marked gesture category and the predicted gesture category, and a third loss between the marked gesture position and the predicted gesture position.

11. A non-transitory computer-readable storage medium storing at least one instruction therein, wherein the at least one instruction, when executed by a processor of an electronic device, causes the processor to perform a method comprising:
    acquiring a target image to be detected;
    determining a gesture category according to the target image, the gesture category being a category of a gesture contained in the target image;
    determining a target key point detection model corresponding to the gesture category from a plurality of key point detection models; and
    performing a key point detection on the target image by the target key point detection model,
    wherein the target key point detection model is trained by:
       acquiring a preset key point detection model and a second sample image marked with the gesture category, the second sample image being marked with gesture key points;
       obtaining predicted gesture key points of the second sample image by inputting the second sample image into the preset key point detection model; and
       acquiring the target key point detection model by adjusting parameters of the preset key point detection model on the basis of a first loss between the predicted gesture key points and the gesture key points marked in the second sample image.

* * * * *